(12) United States Patent
Hinderling et al.

(10) Patent No.: US 8,839,526 B2
(45) Date of Patent: Sep. 23, 2014

(54) SIGHTING DEVICE, IN PARTICULAR TELESCOPIC SIGHT, FOR A GEODETIC MEASURING APPARATUS AND OPTICAL OBJECTIVE UNIT ASSEMBLY FOR SUCH A SIGHTING DEVICE

(75) Inventors: Juerg Hinderling, Marbach (CH); Laurent Stauffer, Widnau (CH); Frank Saupe, Tuebach (CH); Jochen Scheja, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 211 days.

(21) Appl. No.: 13/502,353

(22) PCT Filed: Oct. 27, 2010

(86) PCT No.: PCT/EP2010/066228
§ 371 (c)(1),
(2), (4) Date: Apr. 16, 2012

(87) PCT Pub. No.: WO2011/051319
PCT Pub. Date: May 5, 2011

(65) Prior Publication Data
US 2012/0198712 A1    Aug. 9, 2012

(30) Foreign Application Priority Data
Oct. 29, 2009 (EP) .................................... 09174483

(51) Int. Cl.
*G01C 3/04* (2006.01)
*G01C 15/00* (2006.01)
*G01S 7/481* (2006.01)
*G02B 7/18* (2006.01)
*G02B 23/04* (2006.01)

(52) U.S. Cl.
CPC ............... *G01C 15/002* (2013.01); *G01C 3/04* (2013.01); *G01S 7/4812* (2013.01); *G02B 7/1805* (2013.01); *G02B 23/04* (2013.01)
USPC .......................................................... 33/292

(58) Field of Classification Search
CPC ...................................................... G01C 3/04
USPC .................................................... 33/292, 290
See application file for complete search history.

(56) References Cited

U.S. PATENT DOCUMENTS

| 4,037,944 A | 7/1977 | Hanson |
| 4,952,857 A * | 8/1990 | West et al. ................... 318/561 |

(Continued)

FOREIGN PATENT DOCUMENTS

| DE | 689 976 C | 4/1940 |
| EP | 1 528 358 A1 | 5/2005 |

OTHER PUBLICATIONS

European Search Report dated Mar. 8, 2010 as received in EP Application No. 09 17 4483.

*Primary Examiner* — Christopher Fulton
(74) *Attorney, Agent, or Firm* — Maschoff Brennan

(57) ABSTRACT

A sighting device includes an objective unit, an image unit, a transmitter for emitting measurement beams as transmitted beams and/or a receiver for capturing measurement beams as received beams, and at least one optical deflection means for coupling the transmitted beams into the optical beam path of the sighting device. The at least one lens comprises a cylindrical recess around the optical axis, the recess extending in the direction of the optical axis. Furthermore, the deflection means comprises a cylindrical fastening section that extends inside the recess such that a gluing gap is created between the outer lateral surface of the fastening section and at least a portion of an inner lateral surface of the lens defined by the recess, and the deflection means is fastened to the at least one lens, mediated by an adhesive located in the gluing gap.

19 Claims, 3 Drawing Sheets

(56) References Cited

U.S. PATENT DOCUMENTS

| | | |
|---|---|---|
| 6,545,749 B1 * | 4/2003 | Andersson .................. 356/5.01 |
| 6,765,653 B2 * | 7/2004 | Shirai et al. .................. 356/4.01 |
| 7,193,792 B2 | 3/2007 | Bernhard et al. |
| 7,969,586 B2 * | 6/2011 | Donath et al. ................ 356/630 |
| 2003/0223131 A1 | 12/2003 | Kuczynski |
| 2008/0259449 A1 | 10/2008 | Fruhmann et al. |
| 2011/0023578 A1 * | 2/2011 | Grasser ......................... 73/1.75 |
| 2013/0093882 A1 * | 4/2013 | Kotzur et al. ................ 348/135 |

* cited by examiner

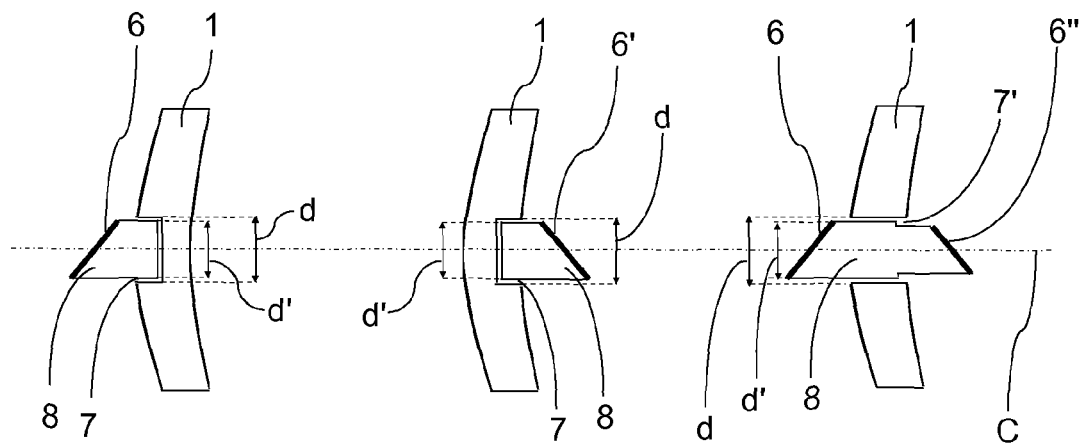
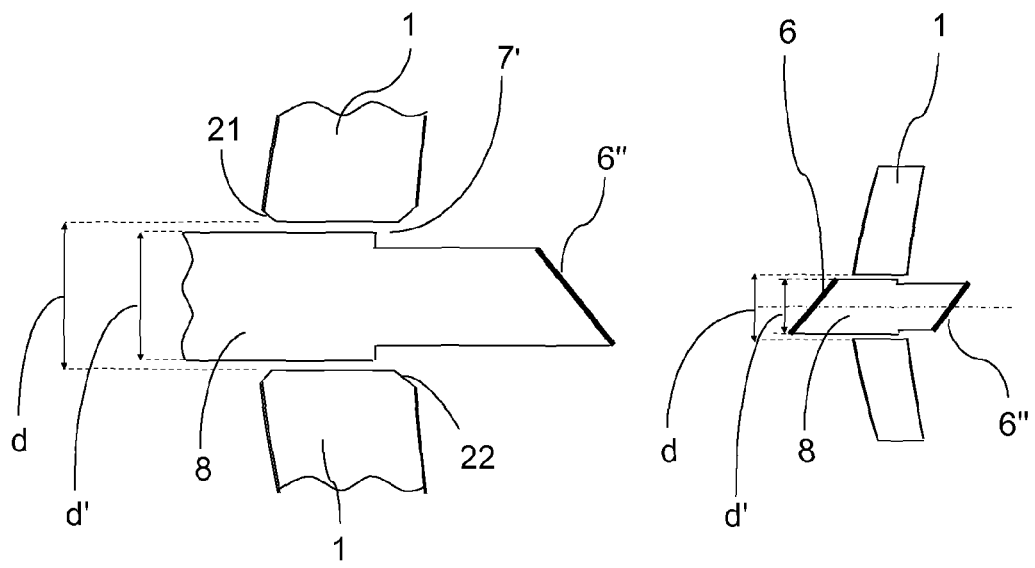
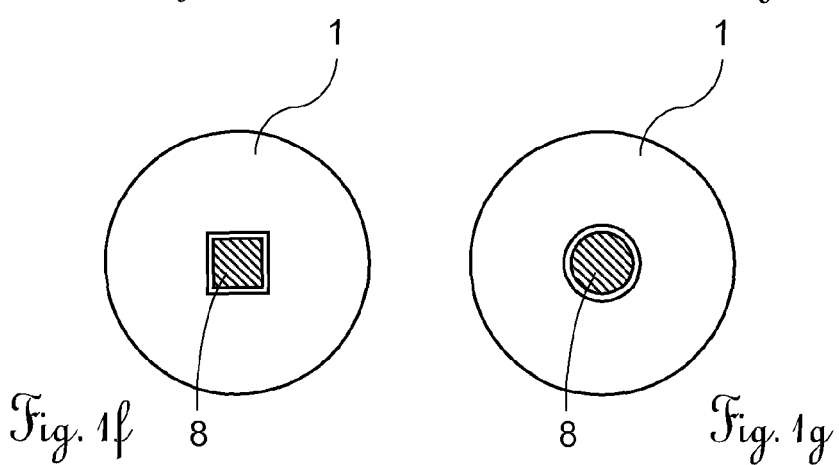

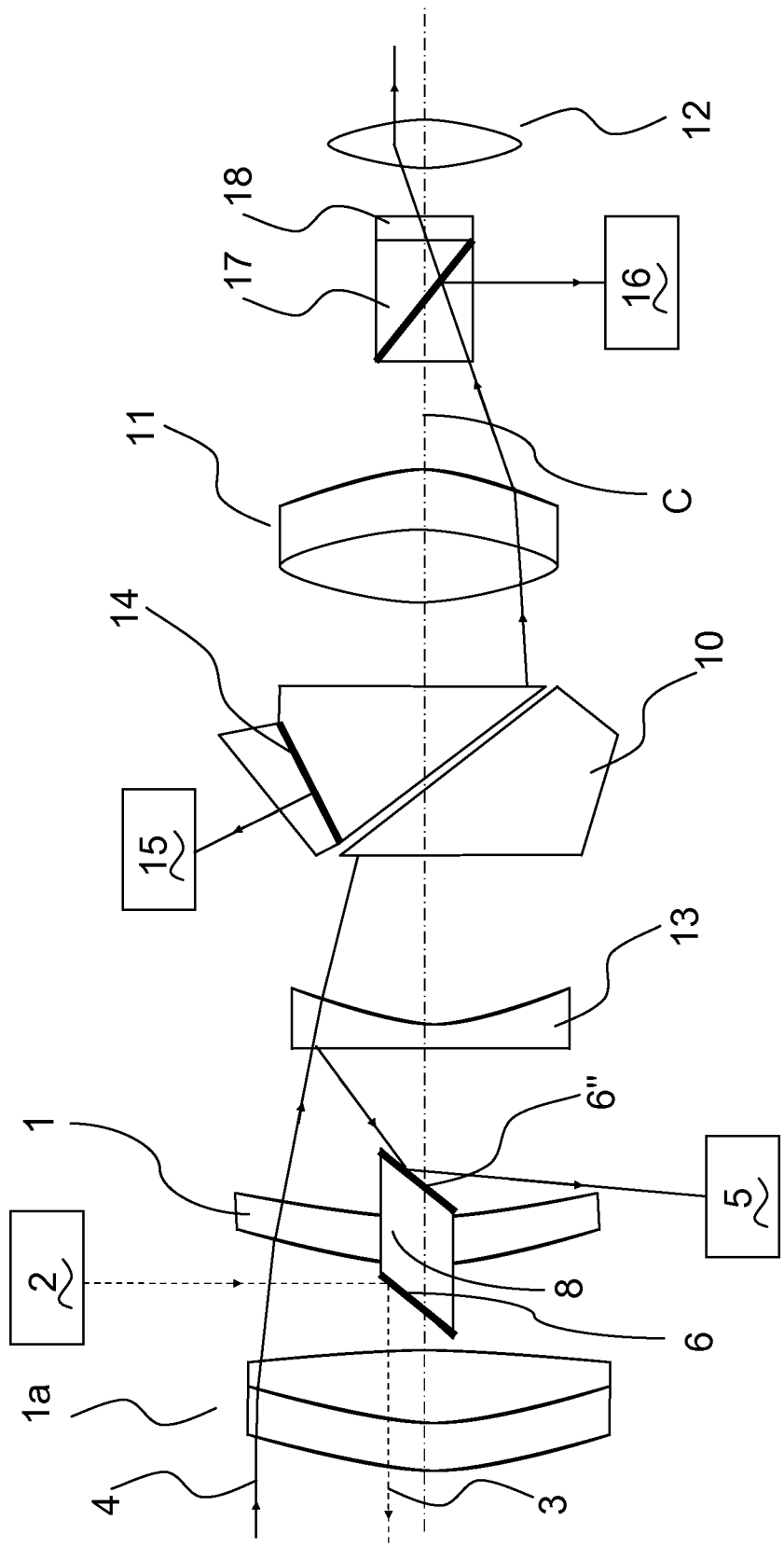

SIGHTING DEVICE, IN PARTICULAR TELESCOPIC SIGHT, FOR A GEODETIC MEASURING APPARATUS AND OPTICAL OBJECTIVE UNIT ASSEMBLY FOR SUCH A SIGHTING DEVICE

FIELD OF THE INVENTION

The invention relates to a sighting device, in particular a telescopic sight for a geodetic measuring apparatus having angle and in particular distance measurement functionality. The sighting unit has an optical beam path between an objective unit, comprising at least one lens, and an image unit such as a camera sensor and/or an eyepiece. The sighting device furthermore contains a transmission unit for emitting measurement beams as transmission beams to a sighted target object and/or a reception unit for acquiring measurement beams as reception beams. The invention also relates to an optical assembly for an objective unit of a sighting device according to the invention, comprising at least one lens and at least one optical deviation means for coupling the transmission beams into the optical beam path of the sighting device and/or coupling the reception beams out of the optical beam path. The invention furthermore relates to two methods for producing the optical assembly according to the invention.

An image unit of a sighting device according to the invention comprises at least one camera sensor and/or an eyepiece for acquiring and/or providing an image of the sighted target object.

BACKGROUND

Sighting devices, in particular telescopes, comprising optical assemblies for input and output coupling of transmission beams and distance measurement beams, respectively, are required for many applications, in particular geodetic, construction and military applications, for example for distance measurement and observation or for observation and imaging with a camera. The required high measurement accuracy demands maximal position and angle stability of the relevant beam paths and associated assemblies. The term "distance measurement beams" or, synonymously therewith, "measurement beams" is used for beams which are reflected in and out by means of an optical assembly in an optical instrument. They also include beams which are reflected in and out in an apparatus but are not used for the measurement, such as beams for observation in the telescope or for imaging with a camera.

For measuring distances, an integrated distance measurement module based on laser technology may be used in optical surveying instruments. For high-precision direction measurement, beam coupling of the laser beam takes place with the optical (target) axis or the optical beam path of the sighting device or general measuring device.

The input and/or output coupling of transmission beams or measurement beams is usually carried out by means of assemblies which comprise a lens, an input and/or output coupling element or optical deviation element, for example a mirror, and a frame by means of which the input and/or output coupling element or deviation element is introduced into the beam path.

In order to be able to guarantee high direction and/or distance measurement accuracy of the instruments, collinearity (parallelism) of the beam path of the sighting device, for example a telescope, and the actual laser beam coupled in must be ensured under extreme external influences (mechanical shock, vibration, temperature change) over a long period of time. The optical deviation element, for example a mirror, which couples the laser beam with the target axis, therefore must be permanently fastened stably with respect to direction and shape, without compromising the optical imaging quality of the sighting device or telescope in the surveying instrument.

The technical challenges consists in keeping a laser beam stable with respect to direction and position relative to a sighting device, in particular a telescope, for example a visual telescopic sight, the optical axis of the telescope in turn being connected stably to an angle sensor system. For the telescope with the laser beam path coupled in, an overall accuracy of seconds of arc or fractions thereof is required.

DE 196 15 601 discloses a coaxial distance measuring apparatus, in which light for a distance measurement is coupled into the optical axis of a telescope via an objective lens and an optical input coupling device, and is coupled out of the optical axis of the telescope via the same lens and an optical output coupling device. In order to introduce the input and output coupling devices into the optical beam path of the telescope, a disk-shaped transparent prism holding plate is used as a frame. The cement connection avoids the optically active face, so that the connection position should not in this case be optically problematic. The disadvantages of using such a prism holding plate as a frame for the input and/or output coupling elements, for example beam instabilities, increased overall length of the telescope or measuring apparatus, difficulty of aligning the frame in the optical beam path of the telescope, sensitivity to temperature variations and mechanical vibrations, are discussed at length in EP 1 662 278 and WO 2006/056475.

For the purpose of avoiding these disadvantages as potential error sources for a measurement and/or target observation, in order to improve the robustness of a sighting device or a telescope, as well as for reasons of cost, it is therefore desirable to minimize the number of constituent components.

For the input and output coupling of measurement beams for distance measurement on the optical axis of a telescope, in certain circumstances—in particular when the aforementioned input coupling element does not fulfill the function of light output coupling—a further optical element is required by which a part of the radiation reflected and/or scattered by an object to be surveyed is transmitted for observation in the telescope and another part is directed to a reception device of the distance meter. In the telescope described in DE 196 15 601, this splitting is carried out by means of a dichroic mirror which is introduced as a further additional element into the beam path of the telescope.

In a tacheometer telescope disclosed in EP 1 081 459 the splitting is carried out by means of a beam splitter prism having semireflective faces. In addition to this beam splitter prism, an input coupling mirror for the input coupling of measurement beams must be fastened in the tacheometer telescope by means of a frame, so that the aforementioned inaccuracies such as instabilities of the beam direction again occur. With each additional element, the risk of the influence of perturbing environmental effects, as well as the disadvantageous effect of reflection losses, increase. Another substantial disadvantage is the space requirement of each individual component and the increased overall length of the optical instrument due to this.

In order to solve the space requirement for frames of additional input or output coupling elements in the beam path or the optical axis of the objective lens, various proposals have recently been disclosed, a common feature of which is that the optical input or output coupling element or deviation element is connected to the planar surface of a planoconvex or planoconcave lens, in the region of its optical axis.

U.S. Pat. No. 6,545,749 discloses a laser distance meter which comprises an optical system having a planoconvex lens and a prism, which is fastened on the planar face of the lens. Transmission ray bundles, transmitted by a laser transmission unit, are deviated by the prism as a deviation element via the planoconvex lens in the direction of a target object. The ray bundles reflected and/or scattered by the target object are collected by the planoconvex lens as reception ray bundle and guided to a detector.

Since for a distance meter—and generally for imaging on a detector or sensor with little or no spatial resolution—no image-forming imaging qualities of the optical components used are required in comparison with a high spatially resolving imaging quality required for a telescope, the plane lens can be used without further measures to improve the imaging quality for this application. On the one hand correspondingly larger imaging errors occur owing to the planar face of the lens, so that the image circle radius—the radius of the dispersion circle in the image plane caused by imaging errors—is greater by a multiple (for example 20 times) than is possible or acceptable for an imaging system of a telescope. The diameter of the image circle (light spot of the reception ray bundle in the image plane) can for example be more than 100 μm, while it should only be from 1 to a few micrometers in a telescope. On the other hand, since conventional photodetectors without requirement for imaging spatial resolution have a photosensitive region with diameters of from 200 μm to 1000 μm, all of the reception radiation can be acquired and evaluated despite the increased image circle.

In order to permit the use of a combination, similar to that in U.S. Pat. No. 6,545,749, of a "plane lens" (planoconvex or planoconcave lens) with an optical deviation element to form an optical assembly in a telescope and to make it possible to fulfill the requirements in this regard for the imaging quality, WO 2006/056475 discusses various possibilities and proposes measures by which imaging errors, in particular due to the "plane lens" can be avoided or corrected and a required conventional visual imaging quality can be achieved.

However, the aforementioned proposals in U.S. Pat. No. 6,545,749 and WO 2006/056475 for resolving the space requirement for frames of additional input or output coupling elements in the beam path or the optical axis of the objective lens have several disadvantages and/or problems for their use in common:

- A connection which is stable, in particular against mechanical vibrations, of a deviation element with a planar fastening face on a lens requires a corresponding planar face of the lens.
- If the lens and the deviation element have not been manufactured integrally, for example by injection molding, such an assembly consisting of a lens and deviation means with only one common connecting surface, produced for example by adhesive bonding, is still susceptible in terms of its stability for example to thermal stresses due to temperature variations and to mechanical vibrations.
- Since there is an adhesive bonding of the deviation means and lens over a relatively large area within the optical beam path of the lens, very stringent requirements must be placed on the optical properties of the adhesive. For example, the adhesive must be optically transparent and as far as possible also free from fluorescence and luminescence. Furthermore, the adhesive should have an equal or similar refractive index to the aforementioned lens.
- The aforementioned stringent requirements on the optical properties of the adhesive greatly restrict the selection range for an adhesive also having mechanically optimal properties: in order for the optical deviation element, for example a mirror, which couples the laser beam to the target axis, to be fastened in a directionally stable fashion, the adhesive must have only a low thermal expansion coefficient; this is because during use, temperatures of between about −40° C. and +70° C. can occur in practice and the directional stability, required at the order of magnitude of seconds of arc, must not be compromised in such a wide temperature range. Furthermore, the water absorption of the adhesive should be as low as possible, even under conditions of up to nearly 100% relative humidity.
- The adhesive bonding of ground surfaces is in principle difficult and potentially of lower stability under strongly varying environmental influences, since the adhesively bonded area is relatively small owing to low surface roughness.
- The use of planoconvex or planoconcave lenses, as described in EP 1 662 278 and WO 2006/056475, entails considerable extra outlay, as likewise disclosed in these two documents, in order to achieve the end result despite a good imaging quality of a telescope.

SUMMARY

It is an object of the present invention to provide a sighting device, in particular a telescope (telescopic sight), for a geodetic surveying apparatus having angle and distance measurement functionality and the function of the input and/or output reflection of measurement beams, in particular for an integrated distance meter, having few optical components but nevertheless high imaging quality according to the species, compact—in particular short—overall length, economical design and high measurement accuracy and robustness against environmental influences, such as temperature variations, mechanical shock and/or vibrations.

It is also an object of the invention to provide an improved optical assembly for an objective unit of a sighting device for reflecting measurement beams into the optical beam path of the sighting device, and optionally reflecting measurement beams out of the optical beam path of the sighting device, having the fewest possible components, in order to increase measurement accuracies, reduce the overall length of the measuring instrument and costs, and to increase the robustness against environmental influences such as temperature, shock and vibration.

It is in this context an object of the invention in particular to fasten an optical deviation element, for example a mirror, as a component of the optical assembly, which for example couples a laser beam with a target axis for direction measurement, permanently in a directionally stable fashion in the beam path of a sighting device, for example a telescopic sight, without compromising the optical quality of the sighting device. Collinearity of the beam path of the sighting device, or the telescope, and a laser beam coupled in must in this case be ensured even under extreme external influences (mechanical shock, vibrations, temperature change) over a long period of time. For the surveying instrument or telescope having a laser beam path coupled in, an overall accuracy of seconds of arc or fractions thereof is required.

It is a further object of the present invention to provide a method for producing an optical assembly according to the invention.

These objects are achieved by the subjects of the independent claims. Features which refine the invention in an alternative or advantageous fashion may be found in the dependent patent claims.

The sighting device according to the invention is intended for a geodetic surveying apparatus having angle and in particular distance measurement functionality, and may for example be formed as a telescopic sight. The sighting device is equipped at least with an objective unit, which defines an optical axis of the sighting device and comprises at least one lens, and an image unit, an optical beam path being defined between the objective unit and the image unit. The image unit comprises at least one camera sensor and/or eyepiece for acquiring and/or providing an image of a sighted target object. The image of the sighted target object can be provided by means of beam splitting, for example even simultaneously, for a camera and an eyepiece.

Throughout what follows, i.e. in the description and claims, the at least one lens of the objective unit is intended to mean either a diffractively acting optical element, i.e. a lens per se, or explicitly also an optical plane plate without diffractive effect.

The sighting device furthermore comprises a transmission unit for emitting measurement beams as transmission beams and/or a reception unit for acquiring received measurement beams as reception beams. A corresponding deviation means is furthermore provided in the beam path of the sighting device in order to couple the transmission beams into the optical beam path and/or couple the reception beams out of the optical beam path.

According to the invention, the at least one lens comprises a cylindrical, in particular continuous recess around the optical axis, which recess extends in the direction of the optical axis. The deviation means furthermore comprises a cylindrical fastening section extending inside the recess of the lens and corresponding in shape and size to the recess, so that a bonding gap is formed between the outer lateral face of the fastening section and at least a part of an inner lateral face, defined by the recess, of the lens. According to the invention, the deviation means is fastened indirectly to the at least one lens by means of an adhesive contained in the bonding gap.

In this context, it is an essential aspect of the invention that the adhesive is distributed uniformly in the bonding gap and around the fastening section, so that the lateral face of the fastening section is essentially coated completely with adhesive and is placed in the recess without direct contact with the lens. Stresses are thereby distributed homogeneously over the bonding gap.

The surfaces of the lens are referred to as the "front surface" in the beam path in the direction toward the target object and, correspondingly, as the "rear surface" which lies opposite the "front surface". The optical axis of the objective unit extends through the centers of the spherical caps associated with the two lens faces. The aforementioned lens may, as mentioned above, also be formed as an optically transparent plane plate, mirrored plane plate or plane plate filter, for example made of glass, without an intrinsic beam refraction function. In particular, the recess, which has a diameter d, is formed as a continuous hole through the front surface and the rear surface, i.e. as a through-hole.

The recess may in this case have a round or polygonal base face perpendicularly to the optical axis.

The statement that the cylindrical recess and the corresponding cylindrical fastening section should be continuous, i.e. in the description and claims, is also intended to include a slightly conical shape—for example due to manufacturing tolerances. What is essential, however, is that the actual adhesive bond thereby defined (i.e. the bonding gap filled with adhesive between the outer lateral face of the fastening section and the inner lateral face of the lens) comprises a small as possible a part of the optically active face for the imaging of the target object.

If the recess and the fastening section of the deviation means are in this case formed with a round base face—perpendicularly to the optical axis—then the cylindrical section of the deviation means may thus, for example, have an outer diameter d' of the part provided as a fastening section perpendicularly to the optical axis of the lens. The front or rear cylindrical recess or the opening of the lens may have an inner diameter of d, the outer diameter d' being less than the inner diameter d.

The aforementioned bonding gap has an average width $b=(d-d')/2$ and is produced between the outer lateral face of the fastening section and the inner lateral face of the recess of the lens.

According to the invention, the deviation means is thus indirectly fastened by means of an adhesive contained in the bonding gap to the at least one lens or plane plate, which therefore acts as a support component for the deviation means.

The optical deviation element is primarily used to deviate the transmission ray bundle coming from the transmission unit at a first predetermined deviation angle into the propagation direction of the transmission ray bundle in the direction of the target object and/or the reception beams in the direction of the reception unit of the sighting device. This is typically done by reflecting the transmission ray bundle into the aforementioned optical beam path and respectively reflecting the reception ray bundle out of the aforementioned optical beam path, in particular parallel or concentrically with the optical axis of the lens. For example, the deviation element may thus be used to deviate the radiation reflected and/or scattered by the target object as a reception ray bundle, which is directed by means of the objective unit into a beam path essentially parallel to the optical axis and typically also essentially symmetrical with the optical axis, out of the optical axis toward the reception unit at a second predetermined deviation angle.

The transmission unit may, for example, be a laser transmitter of a distance measuring unit integrated in the sighting device, so that the transmission beams are emitted for example as laser distance measurement beams. In addition or as an alternative, however, the transmission beams may also be used to generate a projected point-like light spot on the target object (laser pointer), in which case the light spot serves for high-precision sighting of the target object.

As reception beams, measurement beams for example, parts reflected by the target object of the distance may be acquired by a reception unit formed as part of the distance measuring unit. In addition or as an alternative, however, a spatially resolving receiver may also be provided as the reception unit, the receiver constituting a part of a module for automatic target recognition and being formed to acquire target recognition measurement beams as reception beams.

The deviation means may be arranged on the optical axis of the lens, although it does not have to be. Positioning on or as close as possible to the optical axis of the lens is desirable and advantageous for measurements on non-cooperative target object (i.e. non-reflective targets). For measurements with reflected beams having high parallelism in measurements on cooperative targets (i.e. reflective targets), the deviation means should be positioned in a suitable way so that the shadowing, due to the deviation element, of the reflected and/or scattered radiation is minimized.

In particular, the fastening section can extend inside the recess without contact with the inner lateral face, so that there is a continuous bonding gap and the adhesive contained in the bonding gap is uniformly distributed, in particular with the fastening section essentially extending centrally inside the recess and corresponding in shape and size to the recess so that the bonding gap has a uniform defined width and in particular is axisymmetric.

Furthermore, the fastening section of the deviation means may be fastened with minimized stress in the recess of the lens. Stress minimization is achieved by arranging the fastening section inside the recess or opening of the lens without direct contact with its inner face and the adhesive being distributed as uniformly as possible in the bonding gap, particularly with the spigot being adhesively bonded as centrally as possible and therefore not touching the support component. The homogeneous stress distribution over the bonding gap is in this case intended to ensure that, particularly under the influence of large temperature variations (for example between −40° C. and +70° C.) no mechanical stress differences or only minimal mechanical stress differences occur over the entire adhesive bond due to thermally induced expansion or contraction of the lens, optical deviation means and adhesive, or high humidity (for example up to nearly 100% relative humidity), owing to water absorption in particular by the adhesive. There is furthermore in particular a maximally homogeneous distribution of the adhesive in the bonding gap. A symmetrical stress distribution in the bonding gap can ensure very minimal variations in the force equilibrium and therefore comparatively an enormously high dimensional stability.

Furthermore, the fastening section of the deviation means may be arranged with respect to the recess of the lens so that the spigot is not arranged centrally with respect to the recess of the lens but nevertheless does not touch the inner face of the lens. Even in such an embodiment according to the invention, there can be an adhesive layer continuously enclosing the fastening section in the bonding gap between the inner face of the lens and the fastening section of the deviation means, in which case the adhesive may have different adhesive layer thicknesses over its profile. Such a continuous layer can prevent, or minimize, the occurrence of stress differences over the profile of the adhesive. The configuration of the adhesive bond of the deviation means in the recess may be regarded as a crucial factor for ensuring a functionality according to the invention desired by the various embodiments of the subject-matter according to the invention. This configuration of the adhesive bond is an important criterion for achieving robustness against environmental influences, such as temperature variations, mechanical shock and/or vibrations, while the positioning of the deviation means in the lens may constitute a further very important factor in respect of the arrangement and positioning of the components with respect to one another.

In a particular embodiment, the optical deviation means is formed integrally as a spigot comprising the fastening section and formed for example from glass, of which an input coupling end side—in particular facing toward the target object—is chamfered relative to the optical axis and provided with a reflective coating so that the transmission beams (3) are coupled into the beam path in the direction of the target object coaxially with the optical axis. In particular, the chamfer comprises an angle which, relative to a longitudinal axis of the deviation means that extends parallel to the aforementioned optical axis of the objective unit between the input coupling end side and an opposite output coupling end side of the spigot, is equal to half a first deviation angle required for incident transmission beams through the reflective coating.

The optical deviation means may furthermore be formed integrally as a spigot comprising the fastening section, an output coupling end side of which—in particular facing away from the target object—is chamfered relative to the optical axis and provided with a reflective coating so that the reception beams are coupled out of the beam path toward the reception unit. The chamfer may in this case be equal to an angle, relative to the longitudinal axis, corresponding to 90° minus half a required second deviation angle.

In particular, these two embodiments may be combined, for example with a spigot made of opaque gray glass, so that the spigot thus has two separate reflective faces, both for reflecting the transmission ray bundle into the optical axis of the objective unit via its reflective input coupling end side and for reflecting the reception ray bundle out to the reception unit via its reflective output coupling end side. This arrangement very greatly prevents crosstalk of the transmission radiation to the reception unit, of the order of magnitude of $10^{-11}$ to $10^{-12}$ suppression.

In particular, a part of the spigot directed toward the output coupling end side may have a diameter (slightly) smaller than the diameter d' of the part directed toward the input coupling end side. This is advantageous in a process of connecting the lens and the deviation means, or spigot, in an adhesive bonding method.

In particular, a UV adhesive is used which can be cured by UV light. In order to fulfill the requirements for the stability of the optical assembly according to the invention against the influence of different temperatures, the adhesive has in particular a thermal expansion coefficient which is as close as possible to the material being used. In the case of glass, for example, a thermal expansion coefficient of less than ppm/K, in particular less than 40 ppm/K, may be sufficient. Furthermore, the adhesive may in particular have a water absorption coefficient of less than 2%, in particular less than 0.5%.

The optical deviation means may in particular be formed as a prism, cube with a splitter layer or mirror layer, front or rear face mirror, frame mirror or angle mirror. A front surface mirror which is produced by a reflective coating applied on the deviation means or a chamfered end of the spigot, has the advantage that the proportion of undesired radiation scattered from the transmitter into the receiver can be reduced.

As the transmitter or transmission unit of the sighting device according to the invention, a laser is used in particular. The transmission radiation may, depending on the intended application, be divergent and/or diffraction-limitedly collimated, non-visible and/or visible radiation.

The reception unit of the sighting device according to the invention may comprise as the receiver a spatially resolving detector (for example CCD array, CCD row or PSD) or non-spatially resolving detector (for example photodiode or photomultiplier). Further components of the reception unit may be electronic evaluation units, for example for determining (pulsed) light times of flight or wavefront phases or interference patterns and optionally changes thereof.

A refinement of the sighting device according to the invention, an objective unit comprises two lenses each having an optical deviation means. In this case, the two lenses each comprise a cylindrical recess around the optical axis and extending in the direction of the optical axis. Each deviation means comprises a cylindrical fastening section extending inside the respective recess of the associated lens and corresponding in shape and size to the respective recess, so that a bonding gap is in each case formed between the outer lateral face of the fastening section and at least a part of an inner lateral face, defined by the recess, of the respective lens. Each deviation means is fastened indirectly to the respective lens by means of an adhesive contained in the bonding gap.

In a particular embodiment, the sighting device according to the invention is equipped with a mirror system by which the reception ray bundle is directed toward the deviation means and/or the reception unit.

The invention also relates to an optical assembly for an objective unit of a sighting device according to the invention. The optical assembly comprises at least one lens and at least one optical deviation means for coupling transmission beams into the optical beam path of the sighting device and/or for coupling reception beams out of the optical beam path. According to the invention, the at least one lens comprises a cylindrical, in particular continuous recess around the optical axis, which recess extends in the direction of the optical axis. The optical deviation means is equipped with a cylindrical fastening section extending inside the recess of the lens and corresponding in shape and size to the recess, so that a bonding gap is formed between the outer lateral face of the fastening section and at least a part of an inner lateral face, defined by the recess, of the lens. According to the invention, the deviation means is fastened indirectly to the at least one lens by means of an adhesive contained in the bonding gap.

The aforementioned lens is, in particular, configured as a convex lens. The lens may however also be a meniscus lens, concave, planoconvex or planoconcave lens.

A refinement of the optical assembly according to the invention comprises two lenses of the aforementioned type, each having an optical deviation means.

An embodiment of the optical assembly comprising two separate lenses, each having a deviation means, namely a first deviation means for reflecting transmission radiation into the optical axis of the first lens and a second deviation means for reflecting reception radiation out of the common optical axis of the two lenses to a reception unit, offers the advantage that further improved separation of the transmission and reception channels is achieved, i.e. undesired crosstalk between the transmitter and receiver is reduced and the measurement accuracy is increased. A similarly advantageous effect of the separation of the transmission and reception radiation is therefore achieved as by the aforementioned embodiment of a cylindrical spigot, for example made of gray glass, having two separate reflective faces as optical deviation means for reflecting the transmission ray bundle into the optical axis of the lens via the reflective input coupling end side of the spigot and reflecting the reception ray bundle to the reception unit via the reflective output coupling end side of the spigot.

In another advantageous embodiment, the optical assembly according to the invention comprises a mirror system by means of which the reception ray bundle is directed toward the deviation means and/or the reception unit.

An optical assembly according to the invention may be used for input and output coupling of the measurement beams, for example for a distance meter in a telescope. Naturally, measurement beams for example for an optical interferometer, a target acquisition unit, a camera or another measuring unit may be reflected in and out via the optical assembly in a telescope or another measuring instrument. The lens is used in its function as a lens, but at the same time has the additional function of a frame. One fewer component is therefore required in the measuring apparatus.

The sighting device according to the invention may be formed as a telescope. Particularly in this embodiment, the sighting device additionally has an image rectification system. For example, an objective unit comprising deviation means, an image rectification system, a focusing unit, an eyepiece and/or a camera are arranged along the optical axis.

In a telescope or sighting device according to the invention, it is advantageously possible to omit a further component if the image rectification system is also used for two functions. To this end, the image rectification system is arranged between the deviation means and the focusing lens. Then, the image rectification system may, in addition to its image rectification function, be used for a part of the radiation reflected and/or scattered by a target object to be directed onto the deviation means.

The sighting device according to the invention may also be formed as a panfocal telescope. A panfocal telescope is characterized by a magnification which increases with the focal length, magnifications of up to around 50 times being customary. Such high magnifications require a high-resolution diffraction-limited imaging quality. Owing to the omission of auxiliary components such as a mechanical mount, vignetting in the imaging beam path of the telescope is reduced, which promotes the image sharpness and improves the sighting accuracy for the direction measurement.

In particular, a compact and economical design of the panfocal telescope can be achieved when a lens of a first objective unit is used as a frame for the deviation means and a lens of a second objective unit is used as a mirror system. The sighting device formed as a panfocal telescope is, in particular, equipped with a first and a second objective unit, each having at least one lens, a transmission unit for transmitting a transmission ray bundle, a reception unit for receiving the transmission ray bundle reflected and/or scattered by the target object as a reception ray bundle, an image rectification system, a focusing unit and an eyepiece and/or a camera sensor. The first and second objective units, the image rectification system, the focusing unit and eyepiece or camera system are arranged along the optical axis of the panfocal telescope. The panfocal telescope furthermore comprises an optical assembly according to the invention having at least one deviation means for reflecting the transmission ray bundle from the transmission unit into the optical beam path of the panfocal telescope in the direction of a target object and optionally also for reflecting the reception ray bundle out of the optical beam path of the panfocal telescope toward the reception unit. The at least one deviation means is likewise arranged on the optical axis of the panfocal telescope.

Advantageously, the second objective unit of the panfocal telescope is positioned between the deviation means and the image rectification system, and a lens of the second objective unit is used as a mirror system for directing the reception ray bundle toward the deviation means and/or toward the reception unit. Furthermore, in particular, the image rectification system is formed with at least one semitransparent layer, by means of which semitransparent layer beams can be coupled out of the beam path of the panfocal telescope toward at least one second reception unit, in particular a camera. A further beam splitter may furthermore be arranged between the focusing unit and the eyepiece. Furthermore, in particular, at least one third reception unit is provided, in particular a camera, in which case beams are deviated out of the beam path of the panfocal telescope toward the third reception unit by means of the further beam splitter. A target axis marking may furthermore be arranged on the further beam splitter.

The invention also relates to an optical assembly for the above-described objective unit of the sighting device, the optical assembly being formed at least from the lens and the deviation means.

All the definitions, descriptions and advantageous refinements above relating to the formation and fastening, according to the invention, of the lens and deviation means may also be adapted and applied similarly to the optical assembly according to the invention.

The invention also relates to a first and second method for producing such an optical assembly.

In the first production method according to the invention, the fastening section of the optical deviation means is inserted into the recess of the lens in the direction of the optical axis of the lens, the lens being mounted horizontally (perpendicularly to the gravitation vector) and the longitudinal axis of the fastening section being oriented parallel to or coaxially with the optical axis of the lens (i.e. in the direction of the gravitation vector). The lens and the deviation means are in this case mounted so that the deviation means and the lens are movable relative to one another in a horizontal plane—essentially without friction.

The adhesive is introduced into the bonding gap so that under the effect of internal stresses in the adhesive, in particular capillary forces and interfacial tensions between the adhesive and the material surfaces, it is distributed over the bonding gap and, likewise owing to the internal stresses in the adhesive, a continuous bonding gap is produced between the inner lateral face of the lens and the outer lateral face of the fastening section.

The adhesive is cured in the state distributed over the bonding gap, so that the deviation means is fastened indirectly by means of the adhesive to the at least one lens.

By this method, the adhesive can be distributed uniformly over the bonding gap and also, owing to the internal stresses in the adhesive, the fastening section is essentially centrally in the recess and the bonding gap is produced with a uniform width between the inner lateral face of the lens and the outer lateral face of the fastening section.

With this first method according to the invention, the adhesive can furthermore be distributed over the bonding gap so that the fastening section in the recess is arranged either—as described above—centrally or non-centrally, although the bonding gap is present continuously between the inner lateral face of the lens and the outer lateral face of the fastening section. Owing to the continuous bonding gap, stresses can be distributed homogenously over the bonding gap. Particularly in the case of rapid curing of the adhesive, the time required for self-centering—caused by the internal stresses in the adhesive—may be insufficient so that the curing takes place in a still non-central arrangement. Furthermore, for example, vibrations or other mechanical influences during the adhesive bonding may prevent a central alignment of the parts relative to one another.

Owing to the mobile mounting with respect to one another, essentially without friction, of the lens with respect to the deviation means and force effect of the capillary forces in the adhesive, the adhesive can be distributed uniformly around the fastening section so that the lateral face of the fastening section is coated essentially completely with adhesive and is placed in the recess without direct contact with the lens. In this way, stresses are distributed uniformly over the bonding gap.

In particular—at least while the adhesive is being distributed in the bonding gap—the lens or the deviation means is mounted floating in a horizontal plane so that relative mobility of the lens and the deviation means relative to one another in a horizontal plane is ensured. The respective other element, which is not mounted floating essentially without friction, may be held in a fixed position during this.

Furthermore, during the introduction, distribution and in particular curing of the adhesive, the lens together with the deviation means—inserted with the fastening section into the recess—may be rotated about a vertical axis.

In other words, according to this first embodiment of the production method, for example, the mirror spigot may be held, and inserted into the lens, perpendicularly to the gravitational field. The lens is then mounted with the least possible friction with respect to the spigot. Care should be taken that gravity does not influence the position of the lens. After the application of a capillary adhesive with a suitably high adhesion force, the bonding gap can be aligned automatically by the internal stresses associated with the adhesive and interfacial tensions set up with the surfaces of the bonding gap. The capillary forces lead to a uniform configuration of the width of the bonding gap and full coating of the lateral face of the fastening section with an adhesive, so that stresses are balanced homogeneously over the gap. This means that an axisymmetric bonding gap can be formed between the inner diameter d of the recess or opening of the lens and the outer diameter d' by the interfacial tension between the adhesive and the glass parts.

For this exemplary self-centering adhesive bonding, no external forces such as gravity or centrifugal forces should act; these can for example, be minimized or even eliminated by slow rotation of the assembly or perfect leveling, so that the gravitational force is exclusively perpendicular to the bonding gap. The adhesive is distributed homogeneously in the gap by the adhesive forces on the glass or metal surfaces of the deviation means or lens. The deviation means and lens are thus mutually aligned so that a uniform bonding gap is formed.

In the simplest case, the assembly is placed vertically so that the gravitational force is exclusively perpendicular to the bonding gap and therefore exerts no influence on the self-centering action of the adhesive.

This means that a dynamic arrangement can ensure a layout which is balanced in terms of gravity, by the fastening section which is held without friction and contact in relation to the lens being rotated with the lens to be adhesively bonded to it either before injection of the adhesive and/or during injection thereof. The rotation axis is in particular oriented parallel to or coincident with the optical axis of the lens. The rotational speed is selected, for example about 5-10 revolutions per minute, so that any influence of centrifugal forces on the adhesive bonding process is likewise avoided. The effect of the rotation about the optical axis is that the influence of the gravitational force is eliminated on average, and that the fastening section is aligned in the bonding gap, or the bonding gap is aligned with respect to the lens and the pin, without gravitational influence. The effect achieved by this is that the injected adhesive is distributed in the bonding gap essentially only under the influence of capillary forces, and therefore without stress.

According to the second method according to the invention for producing an optical assembly, the fastening section of the optical deviation means is inserted into the recess of the lens in the direction of the optical axis of the lens, the lens being mounted horizontally and the longitudinal axis of the fastening section being oriented parallel to or coaxially with the optical axis of the lens.

The fastening section is adjusted in the recess by high-precision adjustment devices, in particular while observing the bonding gap with a microscope camera or by using image acquisition and evaluation means, so that the fastening section is placed in the recess without contact with the inner lateral face (i.e. without direct contact with the inner lateral face of the recess), and has a continuous bonding gap between the inner lateral face of the lens and the outer lateral face of the fastening section. In particular, the alignment and high-precision adjustment may be carried out so that the fastening section is placed essentially centered (in the middle) in the recess and the bonding gap has a uniform width. As an alternative, the two components may be arranged non-centrally with respect to one another, in which case although the bonding gap is present continuously between the fastening section and the recess, it does not have a uniform thickness over the profile. Adhesive is then introduced into the bonding gap and, essentially under the effect of internal stresses in the adhesive, in particular capillary forces, can be distributed uniformly over the bonding gap, and is subsequently cured in the homogeneously distributed state—and with a homogenous stress distribution over the bonding gap—while the lens and the deviation means are held fixed in the adjusted position.

In particular, while the adhesive is being introduced into the bonding gap and/or is being distributed uniformly over the bonding gap, the fastening section may also be readjusted in the recess by the high-precision adjustment devices.

In the second production method—described in other words—the fastening section of the optical deviation means is introduced into the recess of the lens in the direction of the optical axis. The mirror spigot is in this case mounted perpendicularly with respect to the lens and can be moved precisely by manipulators in all three dimensions. The bonding gap is, for example, observed with a microscope camera or other optical magnification instruments and the deviation means is adjusted, while observing the bonding gap, with high-precision adjustment devices of known design until the fastening section is positioned contactlessly in the recess (in particular centrally in the recess). Subsequently—with the lens and deviation means in this fixed position relative to one another—the bonding gap can be filled with the adhesive, for example a capillary adhesive, and allowed to dry. The positioning may in this case be carried out centrally or non-centrally.

In particular, a capillary adhesive, in particular a UV adhesive, having a high adhesion or capillary force may be used for both methods according to the invention. With a vertical orientation of the gravitational field, a uniform distribution of the adhesive over the fastening section can usually be ensured.

Besides the strength of the adhesive, the design configuration of the connection also significantly influences the positional stability of the deviation means/spigot. With a decreasing adhesive film thickness, the shear strength of the connection increases. In particular, the gap between the fastening section and the deviation means should be as narrow as possible. Furthermore, the internal stresses in the adhesive, due to shrinkage, are very inhomogeneous since internal stresses internally are constantly in equilibrium. In this regard as well, a narrow bonding gap is advantageous.

The same requirements are placed on the adhesive, in particular with respect to thermal expansion coefficient and water absorption, as disclosed above in connection with the optical component according to the invention.

According to a particular embodiment, the recess may comprise a notch as a reservoir for the adhesive—to be introduced into the bonding gap when fastening the deviation means to the lens.

If the recess is configured as a continuous recess, the continuous recess may comprise:
both on one side the reservoir notch as a first notch for the adhesive to be introduced into the bonding gap when fastening the deviation means, and
on the other side a second notch as an adhesive propagation barrier for the adhesive spreading in the bonding gap—in particular by capillary forces—when fastening the deviation means.

The effect advantageously achieved by this production method according to the invention is that the optical deviation element can be fastened in the optical axis of the lens substantially more accurately and stably in terms of position than in conventional arrangements and production methods for optical components of the species. The adhesive bonding regions between the lens and deviation means, or fastening section, do not significantly influence or compromise light ray bundles passing through since they pass through it tangentially and not perpendicularly to the adhesive bonding region. This advantageously obviates stringent optical requirements on the properties of the adhesive, so that there is a wider selection of adhesives having an additionally required low thermal expansion coefficient and low water absorptivity when exposed to high humidity.

The adhesive bonding in a circumferential recess or opening of the lens is substantially more stable than adhesive bonding between two plane-parallel surfaces between the optical deviation means and the lens. The inner wall, or inner lateral face, of the recess or opening of the lens can have much greater roughness compared with an optically polished glass surface. When the roughness is not too great, the surface area of a rough ground surface increases to first approximation quadratically with an increasing surface roughness. The surface to be adhesively bonded thus becomes much greater, which improves the suction effect during the adhesive bonding process and the stability of the adhesive bond. By virtue of the roughness of the parts to be adhesively bonded, the susceptibility to peeling of the adhesive is less than in the case of polished surfaces. At the same time, the risk of the stability of the adhesive bond between the lens and the optical deviation means, or fastening section being compromised, due to long-term degradation phenomena of the adhesive under mechanical, thermal or moisture-induced stress over a prolonged period of time, for example even due to ingress of moisture into the adhesive, is minimized.

Overall, with the production method according to the invention for an optical assembly according to the invention, in particular a target accuracy for the output coupling of a transmission ray bundle of the order of magnitude of a few seconds of arc is achieved, which is not possible with conventional systems with known production methods.

Furthermore, owing to the type of configuration of the optical assembly according to the invention and the method according to the invention for its production, there is no longer the requirement to connect a planar surface of a lens to a planar surface of the optical deviation means. This obviates the requirements otherwise entailed by the planoconvex or planoconcave lens in the beam path for additional corrections and conventional improvements of the other components of a surveying instrument, in particular a telescope, in order finally to achieve the required imaging quality. The production costs of a telescope equipped with an optical assembly according to the invention can therefore be reduced considerably.

BRIEF DESCRIPTION OF THE DRAWINGS

Sighting devices and optical assemblies according to the invention will be described in more detail below purely by way of example with the aid of specific exemplary embodiments schematically represented in the drawings, with further advantages of the invention being discussed:

FIGS. 1a, 1b, 1c and 1e schematically show three exemplary embodiments of optical assemblies according to the invention for an objective unit of a sighting device according to the invention in a cross-sectional representation, FIG. 1d shows a detail enlargement of the optical assembly according to FIG. 1c, FIGS. 1f and 1g show schematic front views of two exemplary embodiments of optical assemblies according to the invention, FIG. 2a schematically shows a first embodiment of the optical assembly of FIG. 1c, which is assigned to a distance meter, FIG. 2b schematically shows a second embodiment of the optical assembly of FIG. 1e, which is assigned to a distance meter, FIG. 3 schematically shows a telescope as a first example of a sighting device according to the invention, having an optical assembly according to the invention for reflecting measurement beams into and out of the optical beam path of the objective, or telescope, and FIG. 4 schematically shows a panfocal telescope as a second example of a sighting device according to the invention, having an optical assembly according to the invention for reflecting measurement beams into and out of the optical beam path of the panfocal telescope.

DETAILED DESCRIPTION

Figures 2A, 2B:
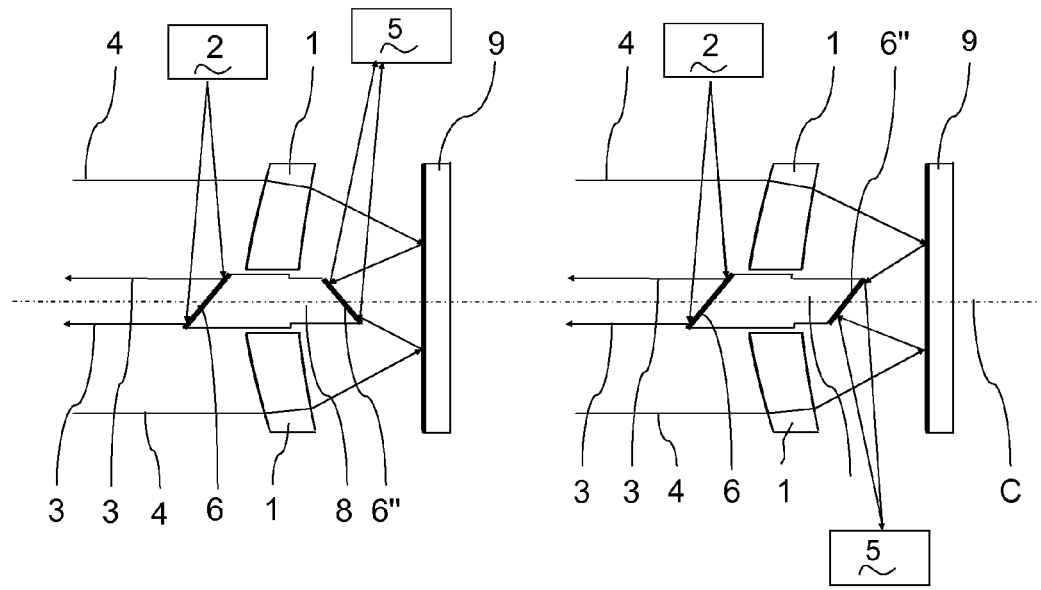

FIG. 1 shows, in subfigures 1a, 1b, 1c and 1e, possible exemplary embodiments of an optical assembly according to the invention. Here, the assembly is assigned a lens 1 and a deviation means 8 having reflective faces 6, 6', 6". The lens 1 will always be represented as a convex lens below, although it may also be formed as a concave, planoconcave or meniscus lens or as a transparent plate without a beam focusing or beam expanding function.

The surfaces of the lens 1 will be referred to below as the "front surface" in the beam path in the direction of a target object and, correspondingly, as the "rear surface" which lies opposite the "front surface". The lens 1 has an optical axis C.

FIG. 1a shows a lens 1 having a front-side cylindrical recess 7, which extends in the direction of the optical axis and has a diameter d. An optical deviation means 8 comprising a cylindrical section, or fastening section, and a reflective face 6 is arranged in the front-side recess 7, in particular concentrically with the optical axis C, the cylindrical section being inserted into the recess 7.

The optical deviation means 8 comprising the cylindrical section has an outer diameter d', the outer diameter d' being less than the inner diameter d, so that a gap is produced between the outer diameter d' and the inner diameter d as a bonding gap with an average width b=(d−d')/2, which is filled with a capillary adhesive in order to produce a stable connection of the lens 1 and the fastening section as part of the cylindrical section of the deviation means 8. The optical deviation means 8 does not directly touch the lens 1, not even in the axial direction. Possible embodiments of the optical deviation means 8, or its beam-deviating function, have been disclosed above. In this embodiment, the deviation means 8 is provided with a reflective face 6 for deviating a transmission ray bundle into the optical axis C in the direction of a target object (the transmission ray bundle and target object are not represented).

FIG. 1b shows an arrangement, mirror-symmetrical with respect to FIG. 1a, of the lens 1 and deviation means comprising a reflective face 6'. The optical deviation means 8 comprising the reflective face 6' and the cylindrical fastening section likewise have an outer diameter d' of a cross-sectional projection of the optical deviation means 8 and of the fastening section perpendicularly to the optical axis of the lens onto the rear-side recess 7 of the lens 1. In this case too, there is no direct contact between the optical deviation means 8 and the lens 1. In this embodiment, the reflective face 6' is provided for deviating a reception ray bundle out of the optical axis C in the direction of a reception unit (the reception ray bundle and reception unit are not represented).

FIG. 1c shows a combination of the arrangements according to FIG. 1a and FIG. 1b. The lens 1 comprises a continuous opening 7' in the form of a hole having a diameter d. A deviation means 8 formed as a spigot is fully inserted into the opening 7'. The deviation means 8 comprises two reflective surfaces 6, a 6" arranged opposite one another along the optical axis C of the lens 1.

In particular, the deviation element formed as a spigot comprising the cylindrical section located between the two reflective surfaces 6, 6" and the fastening section is manufactured integrally. The cylindrical region has a longitudinal axis, an input coupling end side of which, in the propagation direction of a transmission ray bundle toward a target object, is chamfered at an angle corresponding to half a required first deviation angle relative to the longitudinal axis of the cylindrical section and is provided with a reflective coating, and thus forms a reflective face 6. An output coupling end side of the spigot, opposite the input coupling end side, is chamfered at an angle corresponding to 90° minus half a required second deviation angle, relative to the longitudinal axis of the cylindrical section and is provided with a reflective coating, and thus forms a reflective face 6".

The optical deviation means 8 comprising the reflective faces 6, 6" and the cylindrical section located between them has an outer diameter d' of a cross-sectional projection onto the opening 7' on the front surface of the lens, the outer diameter d' being less than the inner diameter d of the opening 7', so that a gap as a bonding gap, in particular optimized for a capillary adhesive, is produced between the outer diameter d' and the inner diameter d.

In particular, the part of the spigot directed toward the output coupling end side has a diameter (slightly) smaller than the diameter d' of the part directed toward the input coupling end side. This is advantageous for the configuration of an adhesive reservoir, in order to deposit excess adhesive as far as possible without force (the transmission ray bundle, target object, reception ray bundle and reception unit are not shown for the sake of a more easily understandable representation).

In FIG. 1d the latter features disclosed with respect to FIG. 1c of the optical assembly according to the invention are represented in a detail enlargement for illustration.

As can be seen in the detail enlargement of FIG. 1d, the continuous recess (7') may comprise
- on one side a first notch (22) or bevel as a reservoir for the adhesive to be introduced into the bonding gap when fastening the deviation means, and
- on the other side a second notch (21) or bevel as an adhesive propagation barrier for the adhesive spreading in the bonding gap—in particular by capillary forces—when fastening the deviation means. The second notch (21) or bevel as an adhesive propagation barrier is a position with low capillary forces, so that further flow of the adhesive (for example dripping out of the gap when the adhesive is injected during manufacture) past this position can be prevented.

FIG. 1e shows another embodiment of an optical assembly according to the invention as a variant of the arrangement according to FIG. 1c, with the difference that the reflection of the transmission ray bundle into the optical axis C and the reflection of reception radiation out took place in mutually opposite directions with respect to the optical axis C of the lens 1.

FIGS. 1f and 1g are schematic front views of two exemplary embodiments of optical assemblies comprising a lens 1 and a deviation means 8. According to the invention, the lens 1 again comprises a cylindrical recess around its optical axis. The deviation means 8 is likewise configured cylindrically and extends with a fastening section inside the recess so that a bonding gap is formed between the outer lateral face of the fastening section and at least a part of an inner lateral face, defined by the recess of the lens. The deviation means 8 is fastened indirectly to the lens 1 by means of an adhesive contained in the bonding gap.

In FIG. 1f, the cylindrical recess of the lens 1 and the cylindrical fastening section of the deviation means 8 has a square base face, while in FIG. 1g they have a round base face.

As an alternative to the embodiments shown in FIGS. 1f and 1g, however, the cylindrical recess of the lens 1 and the cylindrical fastening section of the deviation means 8 may also have an oval or other type of polygonal base face.

FIG. 2a shows a possible form of an optical assembly according to FIG. 1c comprising a mirror system 9. This embodiment is suitable, for example, for combination with a distance meter or a direction sensor with a camera. A transmission ray bundle 3 coming from a transmission unit 2 strikes the reflective face 6 of the deviation means 8 and is reflected by the reflective surface 6 into the optical axis C and directed toward a target object (not represented here). The target object may be cooperative—i.e. self-illuminating or a reflector—although it may equally be non-cooperative, as for example a natural rough surface is. At the target object, the transmission ray bundle 3 is reflected and/or scattered. The reflected and/or scattered part of the reception ray bundle 3, consequently having the same wavelength as the transmission ray bundle 3—referred to as a reception ray bundle 4, which strikes the lens 1, is indirectly directed by means of the lens 1 toward the mirror system 9. The mirror system 9, which may for example be used in a telescope or for image inversion, is represented here as a glass body or planar glass plate having a dichroic reflection layer. The dichroic reflection layer is reflective for light having a wavelength corresponding to the wavelength of the transmission ray bundle, for example for red or infrared light, and transparent for light of another wavelength, for example in the shorter visible spectral range. The mirror system 9 may of course have a different shape, for example being trapezoidally shaped, and it may also be formed from a different optical material. Likewise, the mirror system 9 may be formed from more than just one piece, for example as an Abbe-König prism. By means of the mirror system 9, the reception ray bundle 4 is directed toward the reflective surface 6" of the deviation means 8 and is deviated by means of the reflective surface 6" toward a reception unit 5. The reception ray bundle 4 could also be directed directly by the mirror system 9 toward the reception unit 5. It is naturally also possible to receive the reception ray bundle 4 without a mirror system 9, for example by the reception unit 5 essentially being arranged at the position of the mirror system 9 but at the imaging distance from the lens 1.

The deviation means 8 comprising the reflective surfaces 6, 6" is arranged here or on the optical axis C of the lens 1, or of the measuring apparatus. Such an arrangement 8 coinciding with the optical axis C of the lens 1, and/or of the measuring instrument in which the optical assembly is installed, is advantageous for many applications, for example a distance measurement in a telescopic sight. In general, the deviation means 8 may be made as small as possible, in order on the one hand to minimize the shadowing of the reception ray bundle 4 due to the deviation means—particularly in the case of short distances from the target object—and on the other hand to reduce a diffraction blur in the image plane, caused by central pupil vignetting.

As a variant of the arrangement according to FIG. 2a, FIG. 2b shows a possible form of an optical assembly according to FIG. 1e. Apart from the reversely-oriented reflective face 6" and the arrangement of the reception unit 5 below instead of above the optical axis C of the lens 1 in the plane of the figure, the representation of FIG. 2b corresponds to that of FIG. 2a.

Figure 3:
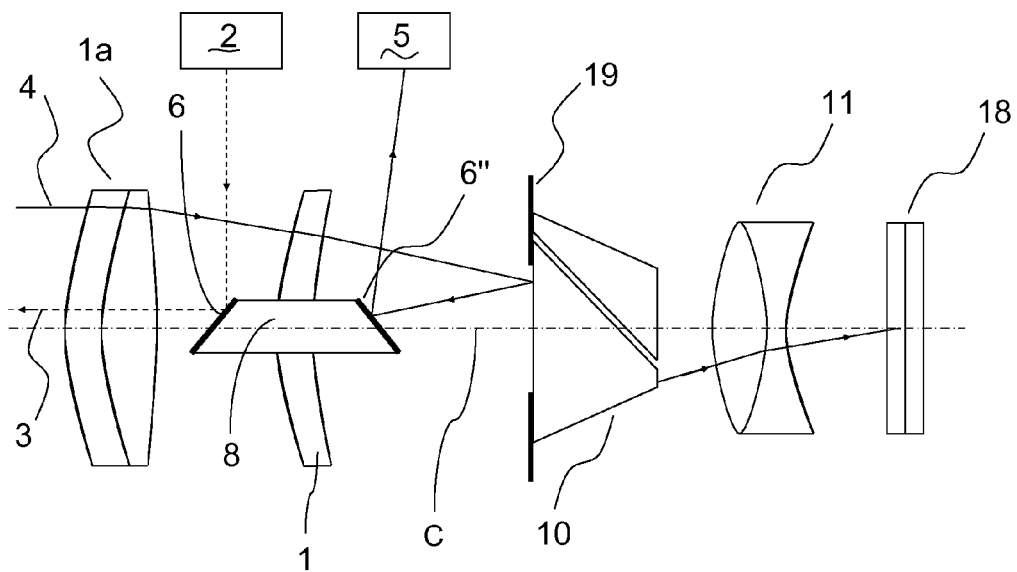

FIG. 3 shows a telescope as an example of one according to the invention, in which an optical assembly of FIG. 1c is used for reflecting transmission beams into the optical axis of the telescope and for reflecting out measurement beams, for example for a distance measurement. A transmission ray bundle 3 emitted by a transmission unit 2, having a wavelength for example in the red or infrared spectral range, is directed with the aid of the reflective face 6 of the deviation means and an objective unit 1a, which may consist of a plurality of individual lenses, toward a target object and the ray bundle reflected and/or scattered at the target object strikes the objective unit 1a and the lens 1 as a reception ray bundle 4 and is directed toward an image rectification system 10. The image rectification or image inversion system 10 is formed here as a Pechan prism comprising a layer which is semitransparent for radiation, in particular a spectrally dichroic layer. Some of the rays reflected and/or scattered by the target object (for example in the red or infrared spectral range, according to the wavelength of the transmission ray bundle 3) are reflected and/or scattered at the image rectification system 10 toward the reflective face 6" of the deviation means 8.

By means of the telescope optics, received ray bundle components which are transmitted by the dichroic coating of the image rectification system 10 are forwarded in the direction of the eyepiece 12 by the focusing unit 11. For reasons of clarity, these ray bundle components are only indicated schematically in the beam path of the telescope after the image rectification system.

In order to sight a target object for example, a target axis marking 18 may additionally be introduced into the image plane of the visual telescope channel. The pupil 19 of the actual visual image may be placed internally in the telescope, while the objective unit 1a and the lens 1 of the optical assembly according to the invention collect the returning reception ray bundle 4 with their full aperture and direct it via the deviation means 6" for the receiver 5. The optical assembly in the telescope may of course also be used for input and output coupling of rays for a camera or another electro-optical apparatus.

FIG. 4 shows a panfocal telescope comprising an optical assembly of FIG. 1e as a second example of a sighting device according to the invention. A panfocal telescope is distinguished by a field of view varying with a distance. In the near field, better object overview is achieved owing to the enlarged field of view, and in the far field a good object resolution is maintained because of the increased angle magnification. The panfocal telescope comprises two objective units having lenses 1a and 13, an image rectification system 10, a focusing unit 11 and an eyepiece 12, and it is constructed so that a high visual angle magnification is achieved at long distances and a lower angle magnification at short distances. In the panfocal telescope according to the invention represented, the optical assembly according to the invention, comprising the lens 1 and the optical deviation means 8 having reflective surfaces 6, 6" is arranged on the right of the first objective unit 1*a* in the plane of the figure.

A transmission ray bundle 3 transmitted by a transmission unit 2, having a wavelength for example in the red or infrared spectral range, is directed with the aid of the reflective face 6 of the deviation means 8 and the objective unit 1*a*, which may consist of a plurality of individual lenses, toward a target object. The ray bundle reflected and/or scattered at the target object strikes the objective unit 1*a* and the lens 1 as a reception ray bundle 4 and it furthermore strikes the lens 13, which is used as a mirror unit for the reception ray bundle 4.

To this end, the lens 13 is configured with a dichroic layer, at which dichroic layer rays having a wavelength equal to that of the transmission ray bundle 3 are reflected and/or scattered in the direction of the reflective face 6" of the deviation means 8 and/or of the reception unit 5. Rays having a different wavelength are transmitted by the dichroic coating of the lens 13. The double functionality of the lens 13, on the one hand as a mirror system and on the other hand for shaping the transmitted rays, contributes to a compact and economical design of the panfocal telescope according to the invention.

The transmitted rays are on the one hand guided in the further beam path of the panfocal telescope extending toward the right in the plane of the figure, also referred to as the "visual channel", to the eyepiece 12 where they are finally available in a manner known per se to a user. On the other hand, rays transmitted by the dichroic layer of the lens 13 are partially coupled out. To this end, the image rectification system 10 is in this case provided with a second layer 14 semitransparent for rays, and optionally likewise spectrally dichroic, for the output coupling of further rays received by means of the first and second objective units, for example for reception by a camera 15, in particular a fixed focus camera as a direction sensor.

In the optical beam path of the telescope, a beam splitter 17 is furthermore arranged between the focusing unit 11 and the eyepiece 12, by means of which beam splitter rays transmitted by the image rectification system 12 and concentrated by the focusing unit 11 can be coupled out, for example for image acquisition by a second, in particular focusable, camera 16. The beam splitter 17 is formed in this case as a splitter cube having a semitransparent, optionally spectrally dichroic, layer. In addition to the function of the beam output reflection, the beam splitter 17 may be used to produce a target axis marking 18 in the image plane of the visual panfocal telescope, a purpose for which an additional element is otherwise generally required in the optical beam path of the panfocal telescope. Various additional measuring and/or acquisition elements may be integrated in the sighting device according to the invention.

It is to be understood that these figures which are provided merely represent examples of possible embodiments.

What is claimed is:

1. A sighting device for a surveying apparatus having angle measurement functionality, which sighting device comprises:
   an objective unit, which defines an optical axis, and includes at least one optical component formed as a lens or as an optical plane-parallel plate;
   an image unit which includes a camera sensor and/or an eyepiece, for acquiring and/or providing an image of a sighted target object, an optical beam path being defined between the objective unit and the image unit;
   a transmission unit for emitting measurement beams as transmission beams and/or a reception unit for acquiring measurement beams as reception beams, and
   at least one optical deviation means for coupling the transmission beams into the optical beam path and/or for coupling the reception beams out of the optical beam path, wherein:
   the at least one optical component includes a cylindrical recess which extends in the direction of the optical axis;
   the deviation means includes a cylindrical fastening section extending inside the recess and corresponding in shape and size to the recess, so that a bonding gap is formed between the outer lateral face of the fastening section and at least a part of an inner lateral face, defined by the recess, of the optical component; and
   the deviation means is fastened to the at least one optical component by means of an adhesive contained in the bonding gap, the adhesive is distributed uniformly in the bonding gap and around the fastening section, so that the outer lateral face of the fastening section is essentially coated completely with adhesive and is placed in the recess without direct contact with the at least one optical component.

2. The sighting device as claimed in claim 1, wherein the fastening section extends inside the recess without contact with the inner lateral face, so that there is a continuous bonding gap with uniformly distributed adhesive contained in the bonding gap.

3. The sighting device as claimed in claim 1, wherein the fastening section extends inside the recess without contact with the inner lateral face, so that there is a continuous bonding gap with uniformly distributed adhesive contained in the bonding gap with the fastening section essentially extending centrally inside the recess and corresponding in shape and size to the recess so that the bonding gap has a uniform defined width and in particular is axisymmetric.

4. The sighting device as claimed in claim 1, wherein the recess has a round, oval or polygonal base face, which is directed perpendicularly to the optical axis.

5. The sighting device as claimed in claim 1, wherein the optical deviation means is formed integrally as a spigot comprising the fastening section, of which a surface of an input coupling end side facing toward the target object is chamfered relative to the optical axis and rendered optically reflective so that the transmission beams are coupled into the beam path in the direction of the target object coaxially with the optical axis.

6. The sighting device as claimed in claim 1, wherein the optical deviation means is formed integrally as a spigot comprising the fastening section, an output coupling end side facing away from the target object is chamfered relative to the optical axis and provided with a reflective coating so that the reception beams are coupled out of the beam path toward the reception unit.

7. The sighting device as claimed in claim 1, wherein the adhesive has:
   a thermal expansion coefficient of less than 60 ppm/K; and/or
   a water absorption coefficient of less than 2%, in particular less than 0.5%;
   the adhesive being a capillary adhesive.

8. The sighting device as claimed in claim 1, wherein the adhesive has:
   a thermal expansion coefficient of less than 40 ppm/K; and/or
   a water absorption coefficient of less than 0.5%;
   the adhesive being a UV capillary adhesive which can be cured by UV light.

9. The sighting device as claimed in claim 1, wherein the sighting device comprises a mirror system, by means of which the reception beams are directed toward the deviation means and/or the reception unit.

10. The sighting device as claimed in claim 1, wherein the recess comprises a notch as a reservoir for the adhesive to be introduced into the bonding gap when fastening the deviation means on the optical component.

11. The sighting device as claimed in claim 1, wherein the recess is configured as a continuous recess, wherein the continuous recess includes:
   on one side a first notch as a reservoir for the adhesive to be introduced into the bonding gap when fastening the deviation means, and
   on the other side a second notch as an adhesive propagation barrier for the adhesive spreading in the bonding gap by capillary forces when fastening the deviation means.

12. The sighting device as claimed in claim 1, wherein the sighting device is a telescopic sight for a surveying apparatus having angle and distance measurement functionality, wherein the at least one optical component includes a cylindrical continuous recess around the optical axis.

13. An optical assembly for an objective unit of a sighting device as claimed in claim 1, the optical assembly comprising:
   the at least one optical component includes a cylindrical continuous recess around the optical axis, which recess extends in the direction of the optical axis.

14. A method for producing an optical assembly as claimed in claim 13, wherein:
   the fastening section of the optical deviation means is inserted into the recess of the optical component in the direction of the optical axis of the optical component, the optical component being mounted horizontally and the longitudinal axis of the fastening section being oriented parallel to or coaxially with the optical axis of the optical component;
   the optical component and the deviation means are mounted so that the deviation means and the optical component are movable relative to one another in a horizontal plane, essentially without friction;
   the adhesive is introduced into the bonding gap so that under the effect of internal stresses in the adhesive with capillary forces, the adhesive is both distributed uniformly over the bonding gap and, likewise owing to the internal stresses in the adhesive, a continuous bonding gap is produced between the inner lateral face of the optical component and the outer lateral face of the fastening section; and
   the adhesive is cured in the state uniformly distributed over the bonding gap, so that the deviation means is fastened by means of the adhesive with a homogeneous stress distribution over the bonding gap to the at least one optical component.

15. The method as claimed in claim 14, wherein the adhesive is both distributed uniformly over the bonding gap and, owing to the internal stresses in the adhesive, the fastening section is essentially centrally located in the recess and the bonding gap is produced with a uniform width between the inner lateral face of the optical component and the outer lateral face of the fastening section.

16. The method as claimed in claim 15, wherein while the adhesive is being introduced into the bonding gap and/or is being distributed uniformly over the bonding gap, the fastening section is readjusted in the recess by the high-precision adjustment devices.

17. The method as claimed in claim 14, wherein at least while the adhesive is being distributed in the bonding gap, the optical component or the deviation means is mounted floating in a horizontal plane so that relative mobility of the optical component and the deviation means relative to one another in a horizontal plane is ensured.

18. The method as claimed in claim 14, wherein during the introduction, distribution and in particular curing of the adhesive, the optical component together with the deviation means, inserted with the fastening section into the recess, is rotated about a vertical axis.

19. A method for producing an optical assembly as claimed in claim 13, wherein:
   the fastening section of the optical deviation means is inserted into the recess of the optical component in the direction of the optical axis of the optical component, the longitudinal axis of the fastening section being oriented parallel to or coaxially with the optical axis of the optical component;
   the fastening section is adjusted in the recess by high-precision adjustment devices while observing the bonding gap with a microscope camera or by using image acquisition and evaluation means so that the fastening section is placed in the recess without contact with the inner lateral face, and has a continuous bonding gap between the inner lateral face of the optical component and the outer lateral face of the fastening section, so that the fastening section is placed essentially centered in the recess and the bonding gap has a uniform width; and
   the adhesive is introduced into the bonding gap and under the effect of internal stresses in the adhesive by capillary forces is distributed uniformly over the bonding gap and is subsequently cured with a homogenous stress distribution over the bonding gap while the optical component and the deviation means are held fixed in the adjusted position.

* * * * *